United States Patent [19]
Kobelt

[11] 4,035,875
[45] July 19, 1977

[54] FASTENER ARRANGEMENTS FOR JOINING OR SEPARATING MATERIAL EDGES OR SURFACES

[76] Inventor: Volkmar Kobelt, Bockeroth, Friedrichshoher Strasse 33, D-533 Konigswinter, Germany

[21] Appl. No.: 582,922

[22] Filed: June 2, 1975

[30] Foreign Application Priority Data

June 5, 1974 Germany .............................. 2427087

[51] Int. Cl.² ............................................. A44B 17/00
[52] U.S. Cl. ................................. 24/203 R; 24/201 B; 24/216; 24/230 SL
[58] Field of Search ........... 24/201 S, 230 BC, 230 F, 24/230 BL, 201 HH, 243 K, 243 M, 243 N, 230 SL, 203 R, 204, 201 B, 201 C, 217, 216

[56] References Cited

U.S. PATENT DOCUMENTS

| | | | |
|---|---|---|---|
| 2,627,097 | 2/1953 | Ellis | 24/201 B |
| 3,008,209 | 11/1961 | Kurt | 24/201 B UX |
| 3,095,625 | 7/1963 | Propst | 24/217 |
| 3,102,314 | 9/1963 | Alderfer | 24/204 |
| 3,426,385 | 2/1969 | Gutshall | 24/217 X |
| 3,732,597 | 5/1973 | Epstein | 24/230 SL X |
| 3,808,648 | 5/1974 | Billarant et al. | 24/204 |

FOREIGN PATENT DOCUMENTS

| | | | |
|---|---|---|---|
| 749,101 | 5/1933 | France | 24/216 |
| 862,022 | 3/1961 | United Kingdom | 24/201 C |

*Primary Examiner*—Donald Griffin
*Attorney, Agent, or Firm*—Spencer & Kaye

[57] ABSTRACT

A fastener arrangement for joining or separating material edges or surfaces along a distance of indeterminate length has two cooperating fastener halves secured to the one and the other material component to be joined or separated. At least one of the fastener halves is flexible lengthwise. Serially arranged discrete or non-discrete (continuous) elements of the one and the other fastener halves cooperate with one another to form element pairs which can assume a first stable position in which the elements of the element pair are in a full mechanical interengagement with one another, a second stable position in which the elements of the element pair are mechanically fully disengaged from one another, and an unstable position in which the elements of the element pair are in a partial mechanical interengagement with one another. Each element pair includes a force-exerting structure which is so designed that in the unstable position of the element pair the force urges the elements of the pair from the unstable position into one of the stable positions and, at the same time, interaction occurs between adjoining elements of the fastener halves to effect self-propagation of a transition from one stable position of the element pairs through the unstable position into the other stable position.

24 Claims, 31 Drawing Figures

FIG. 4a  FIG. 4b  FIG. 5a  FIG. 5b
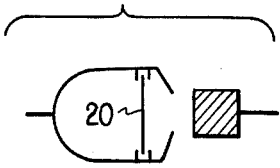 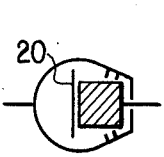 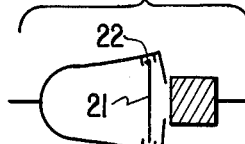 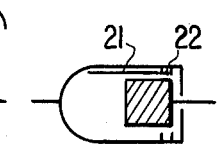
FIG. 6a  FIG. 6b  FIG. 7a  FIG. 7b
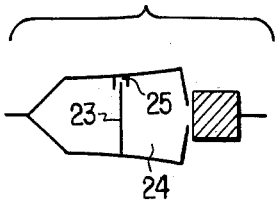 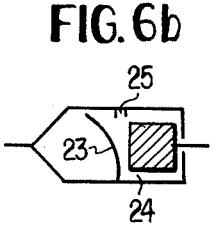 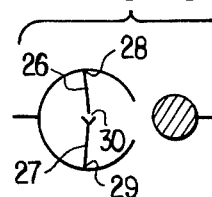 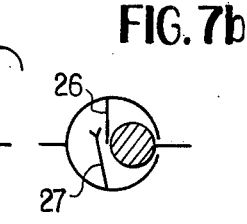
FIG. 8b  FIG. 8a  FIG. 9a  FIG. 9b
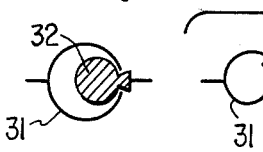 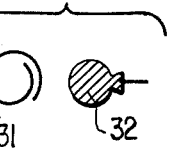 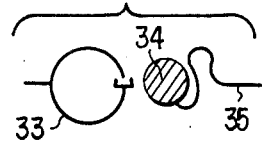 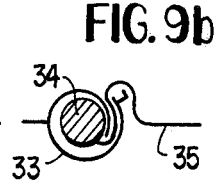
FIG. 10a  FIG. 10b  FIG. 11a  FIG. 11b
  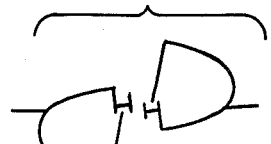 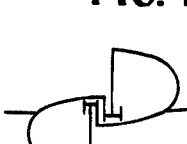
FIG. 12a  FIG. 12b  FIG. 13a  FIG. 13b
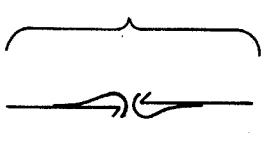 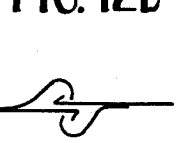 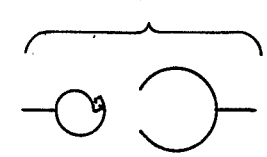 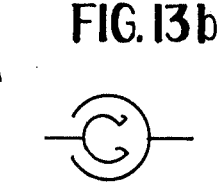
FIG. 14a  FIG. 14b  FIG. 15a  FIG. 15b
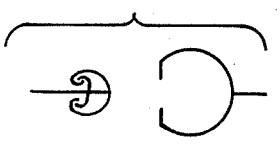 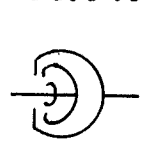 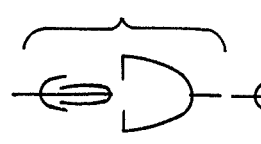 

FASTENER ARRANGEMENTS FOR JOINING OR SEPARATING MATERIAL EDGES OR SURFACES

BACKGROUND OF THE INVENTION

This invention relates to fastener arrangements for joining or separating articles at their edges or surfaces, particularly of the flexible type.

Slide fasteners serving for a repeated joining and separating of two flexible edges are well known. The joining and the separating is effected by means of a shift of the boundary between the zones of the joined state and separated state. At least for the joining operation a slide member has to be operated which is associated with the above-mentioned boundary and which joins, or respectively, separates the two halves of the slide fastener. In widely known cases of use, for example in slide fasteners for apparel, the slide member is manually operated. This, however, gives rise to difficulties if the slide fastener extends into zones that are not easily accessible. Further, there is likely to occur an undesired pinching of material between the slide member and the slide fastener halves. The occurrence of such pinching is enhanced by the fact that joining is brought about by a force exerted on the slide member in a longitudinal direction. As a result, folds are formed in the material of the apparel exactly at locations where they tend to obstruct such joining and may be pinched between the slide fastener halves. This situation is further worsened by the often occurring, reflex-like reaction of the operating person, in that an increased force of short period is applied.

Slideless, flexible magnetic fasteners for apparel are known. In connection with these structures the possibility has also been considered to connect manually only at one location the cooperating parts of the fastener halves to be connected to one another; the connecting process then propagates by itself. In this connection reference is made to the disclosures in U.S. Pat. Nos. 2,627,097 and 3,008,209.

Embodiments of the above-outlined arrangements however, have not been widely used, probably, because the generated forces were found to be too weak and/or the manufacturing costs too high. Further, it appears that fasteners of the above-outlined type are used primarily with overlapping fabric portions. In these structures the substantial opening forces which are oriented parallel to the fabric surfaces are resisted additionally or principally by means of a mechanical interference due to a proper design of the surfaces.

It was found to be desirable to make fasteners of a simpler structure and, preferably, of unitary material, wherein the state of connection propagates by itself.

SUMMARY OF THE INVENTION

It is an object of the invention to provide an improved slideless fastener arrangement in which a separation and a joining of flexible edges occurs by means of shifting the boundary between the connected and separated zones and which operates without the use of magnetic or other remotely effective forces for effecting the mutual attraction of cooperating parts of the fasteners halves.

This object and others to become apparent as the specification progresses, are accomplished by the invention, according to which, briefly stated, the fastener arrangement for joining or separating material edges or surfaces along a distance of indeterminate length has two cooperating fastener halves secured to the one and the other material component to be joined or separated. Serially arranged discrete or non-discrete (continuous) elements of the one and the other fastener halves cooperate with one another to form element pairs which can assume a first stable position in which the elements of the element pair are in a full mechanical interengagement with one another, a second stable position in which the elements of the element pair are mechanically fully disengaged from one another, and an unstable position in which the elements of the element pair are in a partial mechanical interengagement with one another. Each element pair includes a force-exerting structure which is so designed that in the unstable position of the element pair the force urges the elements of the pair from the unstable position into one of the stable positions. When a separating or joining is started at one location, there is effected a self-propagating transition, from element pair to element pair, from the one stable position to the other. This self-propagation is effected by the interaction between cooperating elements of an element pair (for example, by pushing out of the way components which obstruct the motion of the elements) and/or by the effect of adjoining elements which are attached to the same material edge or surface and which are in a different condition of mechanical interengagement than the element pair which they affect.

In designing the above structure, consideration has to be given to a coordination of the motion of the elements - with respect to themselves or with respect to adjoining elements of the same edge - with the state of interengagement and the relative position and distance of elements that belong to one another; in particular, interacting elements of the same edge should be disposed sufficiently close to one another in order to insure that a mechanical contact will have the desired effect.

Accordingly, the movement of the elements is effected by virtue of an approach of the cooperating elements to one another and an appropriate interaction generated in this manner by pushing out of the way, by virtue of mechanical contacting, a component which obstructs an internal motion and/or by the effect of neighboring, already more completely joined elements by means provided for this purpose. The elements are arranged in such a manner that in the vicinity of already completely connected elements at the boundary between the joined and separated state there are always present elements in which the attraction has already been triggered by virtue of a sufficient approach, insofar as a connection has not yet been completely established. In this connection often use can be made of a certain stiffness of the edges to be joined to one another by the fastener. This stiffness ensures that the elements to be connected to one another at the boundary between the joined and the separated state are guided to one another in a proper manner and that a resistance encountered during the elimination of the above-noted obstruction is overcome by the attraction effect of adjoining elements which are already in a more complete mechanical interengagement.

Thus, at the boundary between the joined and separated zones, the edges are attracted to one another by means of the above-mentioned elements and, as a result, the boundary shifts automatically in the direction of an increase of the joined zone provided the edges in the separated zone are not held apart by external forces.

The arrangement according to the invention can replace a conventional slide fastener if the attracting elements according to the invention are so designed that the joining and separating operations are repeatable. An interaction between elements of the same edge of surface may ensure that separation, or joining, or both is effected (without causing damage and with the application of a proper force) only at the boundary between the joined and separated zones. To cause propagation of the separation, the edges have to be pulled apart in the already separated zone, whereas to cause propagation of joining, the edges merely have to be rendered free.

In the above-outlined solution the joining is distinguished from the separating operation by its automatic propagation. It is, however, feasible to effect, exactly in the same manner, an automatic separation as well by arranging along the edges elements which repel each other. Such repulsion is brought about by the various, above-discussed, more or less direct effects of the closeness of the elements. In case elements for a repeated joining and separation are used, the joining has to be effected by direct action on the boundary to be shifted.

The above-outlined principle for the automatic shift of the boundary between the joined and separated zones may find application without difficulty in case flexible surfaces, rather than edges, are to be joined or separated. The difference in the event that the boundary is a straight line is of no particular significance. It is easy, however, to imagine cases in which the joined or separated state, as the case may be, propagates in all directions from one point or from a general zone which is different from case to case. In many cases one can obtain an arrangement for joining or separating surfaces by applying to the surfaces, in a sufficient density, devices which were originally conceived for the joining or separating of the edges.

Further, the number of the edges or surfaces that are to be joined or separated by the shifting of the boundary is not limited to two.

When discussing elements, the arrangement should not exclude the possibility that the elements continuously pass into one another in the longitudinal direction and, in case of edges, they may do so even without a discrete structure of the elements of the two fasteners halves.

For some applications it is desirable to remotely control the activation of the individual functions. For example, the property of the elements to attract one another is activated at a moment in which the joining should start. At another moment it may be desired to deactivate attraction, for example, simultaneously with a deactivation of a locking arrangement which prevents a separation in the joined zone by external forces, so that a separation of the entire connection is possible in one stroke. For this purpose there is applied, in a manner adapted to the invention, an electrical, mechanical, pneumatic or hydraulic signal simultaneously to each element. Such a mechanical signal could be constituted, for example, by a short shift of a toothed flexible rack arranged along the edges. In general, the signal is guided along the edges or surfaces, whereby a dependence of the condition of adjacent elements is possible. In this manner it is feasible to apply an energy-consuming signal only up to the boundary between the joined and separated states.

By way of explanation it is to be noted that in case of arrangements with particular mutual interaction between the neighboring, cooperating elements, in general a particular terminal is provided at the ends of the edges or the borders of the surfaces. The design of such terminal depends upon the individual embodiment and the intended use. The application of the new principle according to the invention makes possible, in contradistinction to fasteners provided with slide members, to provide branch-offs in the edges to be joined or separated.

The advantage of embodiments which may serve as replacements for the conventional slide fasteners, resides in the fact that no slide member has to be activated and that during joining no forces directed to the separated zone appear at the boundary between the joined and separated zones and thus the formation of folds which may be pinched between the edges is avoided. Further, the applied forces are maintained within limits if, nevertheless, a pinching of the material occurs. Further, novel structural solutions with additional advantages are feasible.

The present invention accomplishes the objectives of the invention entirely independently from the known arrangements which involve a magnetic attraction of the elements. Further, particularly with elastic embodiments, greater forces than heretofore may be exerted, a more simple manufacture of simpler and unitary materials is possible and a more durable product is obtained. Further, in the material portions (edges or surfaces) to be joined, there may be effected a greater concentration of the arrangement at the edges of these material portions (lesser overlap) than it was possible heretofore. Furthermore, a combining of these two principles insures a greater freedom of design.

An exemplary practical application of the above-outlined fastener embodiment according to the invention would be, for example, an arrangement for the rapid emptying of a container for liquid or bulk material. For this purpose the flexible bottom of the container is divided by automatically closing slide fasteners, the opening of which is effected by a short-period mechanical signal at a location or at several locations. The propagation of the separation may be effected by the pressure of the contents or by remote control. An instantaneous full opening in one stroke is also feasible if the unlocking of the elements is effected by remote control.

A similar arrangement in a wall of a container which is sought to be maintained closed, makes possible to manipulate a component (such as a handling tool) through the wall while the aperture conforms to the circumference of the component.

Arrangements for the automatic - and irreversible, if desired - connection may be used for expediting packaging processes. The same applies to effect connection of wires of a circuit (this is an example in which the joining of edges is not used for joining large bodies along the edges). Arrangements for the automatic separation may be used for expediting package-opening operations.

The automatic joining of edges or surfaces may find application, for example, in the multiple connector plugs or similar arrangements for connecting a plurality of elements. If, for example, one of the connector plugs is designed as a flexible strip and on both plugs there are provided means for the automatic joining, it will be necessary to use all at once the sum of the forces to overcome the friction arising due to contact pressures during the separation which still requires external forces.

In some embodiments according to the invention, between the adjoining elements no particular interaction exists aside from the vicinity itself and occassionally the stiffness of the edges or surfaces which carry the elements or - in case the edges or surfaces are formed of components articulated to one another - aside from the limitation of the freedom of movement of adjoining components with respect to one another.

BRIEF DESCRIPTION OF THE DRAWINGS

FIGS. 4a - 15a are schematic cross-sectional views of further embodiments, illustrating the fastener halves in a separated state.

FIGS. 4b - 15b are schematic cross-sectional views of the same embodiments, illustrating the fastener halves in a joined state.

DESCRIPTION OF THE PREFERRED EMBODIMENTS

Figure 1A:
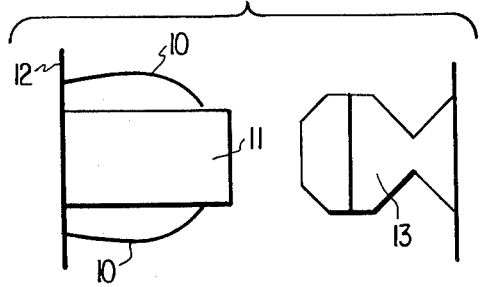
FIGS. 1a and 1b are schematic top plan and side elevational views, respectively, of an embodiment of the invention illustrating the fastener halves in a separated state.
Figure 1C:
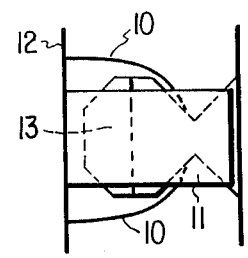
FIGS. 1c and 1d are schematic top plan and side elevational views, respectively, of the same embodiment, illustrating the fastener halves in a joined state.
Figure 1B:
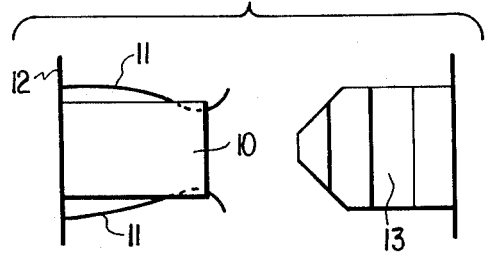
Figure 1D:
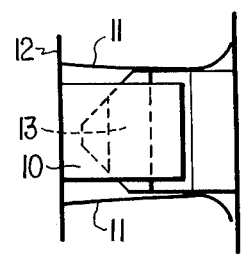

Turning now to FIGS. 1a - 1d, there is shown an embodiment formed of elastic elements. The series of elements of this embodiment may be used on longitudinally sufficiently rigid edges or surfaces. FIGS. 1a and 1b show the elements in a separated state as seen in a top plan and side elevational view, respectively. FIGS. 1c and 1d show the elements in a joined state as seen in a top plan and side elevational view, respectively. It is seen that the left-side element is formed of a first pair of leaf springs (resilient fingers) 10 and a second pair of leaf springs (resilient fingers) 11 secured symmetrically to a plate 12 which extends, for example, along the edges of a rectangle. The other, right-hand element or head 13 is made of a substantially non-elastic substance and may be inserted into the socket constituted by the four leaf springs of the left-hand element. In the separated condition, the fingers 10 rest, with their free edges, on the lateral edges of the fingers 11. The head 13 is designed in such a manner that upon movement of the left-hand and right-hand elements towards one another, the element 13 further separates the springs 10 biased towards one another, and then separates the springs 11 to such an extent that the latter will no longer be in the path of the springs 10. Thereafter the springs 10 are gradually released by the penetrating element 13, whereby the motion of the latter is enhanced. It is apparent that this procedure can be completely reversed (and is thus repeatable) by applying external forces.

Contrary to the above-described embodiment, a particular interaction between elements is necessary in case the joined zone is to be protected against separation or the separated zone is to be protected against joining by a locking device which permits a joining or a separation, as the case may be, only by virtue of the shift of the boundary between the two zones. In the embodiments that may replace the usual slide fasteners, for example, the attraction or locking of the cooperating neighboring elements which are essentially already connected, may be initiated by levers, shafts or bolts.

In this connection particularly those embodiments for the joining or separating of two or more edges are to be mentioned which accomplish all functions based on the proper selection of their material and cross section which, in principle, is constant along the entire edge. These are, in part, similar to the known profile slide fasteners, except that they do not require a slide member, but use, for example, pneumatic or, in particular, elastic energy level differences between the joined and separated zones for causing propagation of the boundary between the joined and separated zones. In the description which follows there will first be discussed, for the sake of simplicity, the use of elastic energy.

Figure 2A:
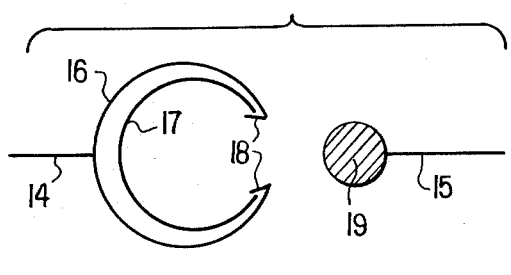
FIGS. 2a and 2b are schematic cross-sectional views of another embodiments, illustrating the fastener halves in a separated and in a joined state, respectively.
Figure 2B:
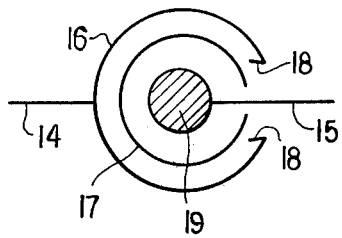

In FIGS. 2a and 2b there is shown, in schematic cross section, in a separated and joined state, respectively, an embodiment adapted to replace a conventional slide fastener. It is noted that the sectionally illustrated shell-like components are drawn only with single solid lines. To illustrate the spatial relationship, the carrier ribbons 14 and 15 to which the fastener halves are attached, are also illustrated. To the carrier ribbon 14 there is affixed a longitudinally open tubular member 16 which is essentially rigid cross-sectionally. Within the tube 16 there is disposed a smaller, slit-open tubular member 17 which is made of an elastic material and which stores the energy necessary for the joining operation. In the separated state, the tube 17 is radially spread apart and is maintained in this condition by engaging, with its edges, behind the hooked ends 18 of the external tube 16. To the other carrier ribbon 15 there is secured a flexible rod 19 of such a diameter that it can pass between the hooked ends 18 of the external tube 16. In the joined state, the rod 19 is surrounded by the inner tube 17 which cannot pass through the slot of the external tube 16.

Figure 3:
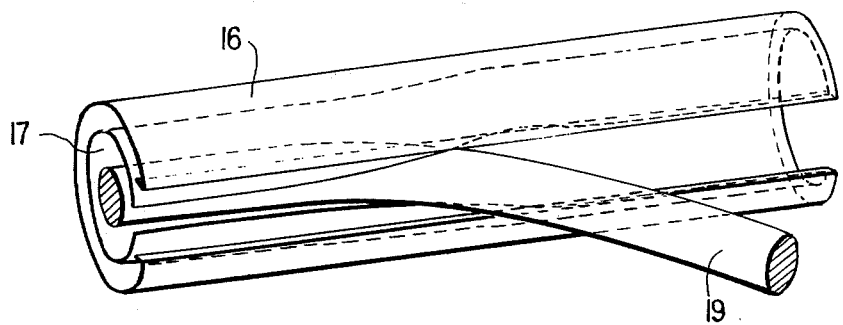
FIG. 3 is a schematic perspective view of the same embodiment along the boundary zone between the separated and the joined states.

For illustrating the mode of operation of the embodiment shown in FIGS. 2a and 2b, reference is made to FIG. 3 which depicts, in a perspective view, the boundary zone between the joined and separated states. At the location where the flexible rod 19 passes through the slot edges of the two tubes 16 and 17, it forces radially outwardly the edges of the inner tube 17. From this location the inner tube 17 changes into its released condition in the direction of the joined zone and into its stressed condition in the direction of the separated zone. A longitudinally oriented stiffness of appropriate cross-sectional components of the inner tube prevents the inner tube 17 from being released from the boundary zone on, without enlarging the joined zone (that is, without pulling inwardly the flexible rod 19 at the portions which are being released). By virtue of the non-symmetrical arrangement between the joined and separated zones it may be accomplished in particular that at the location of the greatest distance between the slot edges of the elastic tube 17 the edges do no longer engage the flexible rod 19. The problem of stability of the energy zones (levels) in the ends that are held together in the zone of the greater energy level or the problem of a firm relationship between the energy level and the state of connection is not critical; these problems may be resolved in the embodiment illustrated in FIGS. 2a, 2b and 3 by a slight modification of the spatial arrangements. For example, the means for maintaining the inner tube 17 in a tensioned condition (higher energy level) need not be located at the slot edges of the two tubes but may be disposed at other locations, for example, in case of the inner tube 17, at the outside and in the case of the outer tube 16, on the inside. In this manner, it may be achieved that in the tensioned state (that is, in the separated zone) the slot edges of the elastic tube 17 are closer to one another than the thickness of the flexible rod 19 whereby there is provided a play for a stable sliding introduction of the tensioning means into one another.

Similarly, with a slight modification of the arrangements along the two edges it is possible to guide the flexible rod 19 also in the inside of the tensioned tube 17 and to guide it outwardly at the boundary to the zone of release, to obtain in this manner an arrangement for the automatic separation of a connection.

The embodiment illustrated in FIGS. 2a, 2b and 3 follows a principle which may find application in numerous other examples, such as flexible profiles arranged along the edges, thus parts having, along the associated edge, a constant cross section which may also be formed of several loosely-connected components. These parts are, in the connected (joined) state, hooked to one another in such a manner that a separation of the joined zone or a joining of the separated zone is not possible without deforming the cross section. Further, the profiles may be at different energy levels which, in the elastic case, are associated with different cross sections. The above-noted necessary deformation at the boundary between the joined and separated zone is used simultaneously for a stable separation of different energy zones which may simultaneously exist along the same arrangement. A separation and edge deformation of the profiles at the boundary effects a pressing apart or pressing together of the profile components in such a manner that, because of a stiffness of the profile components in the longitudinal direction, the profiles, starting from the point of deformation, change in both directions in a stable manner into the corresponding other state.

Further examples based on this principle will be described below. First elastic embodiments will be discussed, wherein the elastic energy, however, may be replaced by non-elastic energy.

The embodiments illustrated in FIGS. 4a, 4b, 5a, 5b, 6a, 6b and 7a, 7b are similar to the embodiment discussed in connection with FIGS. 2a, 2b and 3 in that a longitudinally slit-open elastic tube surrounds a rod in the connected state. They differ, however, from that embodiment in that the means for maintaining the elastic tube in a tensioned condition (that is, in a state of higher energy level) is situated inside the tube.

According to the embodiment illustrated in FIGS. 4a, 4b, a band-shaped body 20 spreads apart oppositely located portions of the tube walls or, as the case may be, releases the same by virtue of being displaced parallel to itself.

In the embodiment according to FIGS. 5a, 5b, the release is effected by a swinging motion of a band 21 about one of its edges loosely connected with the outer tube at 22.

In the embodiment according to FIGS. 6a and 6b, the band 23 is, along one of its edges, fixedly secured to the outer tube at 24. By virtue of the flexibility of material, the band 23 may sufficiently bend away from the linear zone 25 which it has to touch for the tensioning of the outer tube.

In the embodiment according to FIGS. 7a, 7b there are provided two ribbon-like members 26 and 27 which are affixed along one of their edges at diametrically opposite linear zones 28, 29 of the tube and which are generally in a planar alignment with one another. The adjacent free edges of the bands 26 and 27 are provided with cooperating complemental means 30. As seen in FIG. 7a, the means 30 are in an interengaging relationship in the separated state of the fastener (tensioned condition) whereas as it may be observed in FIG. 7b the means 30 are disengaged so that the free edge zones of the bands 26, 27 are in a side-by-side disposition in the joined state of the fastener (released condition). If the two bands 26, 27 are replaced by a properly designed shell which can be caused to buckle towards the one or the other side for assuming there a stable position, there is obtained an arrangement without loose parts and without non-continuous mode of operation within the individual profiles. If the fastener is designed for a single use, the means for maintaining the tensioned condition may be of the type that are destroyed during the connecting (joining) step.

FIGS. 8a, 8b illustrate a simple arrangement for an automatic separation. Here, the elastic tube 31 is spread apart by the flexible rod 32 which is surrounded by the tube 31 in the connected state.

A similar arrangement for an automatic joining is illustrated in FIGS. 9a and 9b. In the higher energy level (separated state) the edges of the tensioned elastic tube 33 are situated on one another. In the joined state, on the other hand, the edge zones of the tube 33 are in an overlapping relationship. If, for example, the flexible rod 34 is to be connected with a carrier ribbon 35 (which, for example, is part of the fastener), the latter expediently has a sufficiently rigid cross section of meandering shape to pass between the mutually overlapping edge zones of the elastic tube 33. A straight passage instead of a meandering one can be achieved if at least one of the overlapping tube portions has a segmented comb-like configuration and in the connecting portions there are provided openings for the comb teeth. Such an arrangement does not mean a substantial departure from the principle of a constant cross section: the arrangement acts (apart from side effects that are to be maintained insignificant and which, under certain circumstances, may be undesirable) like the one of constant cross section made of different materials which partially can, and partially cannot extend through one another and which, however, since they do not exist in reality, are simulated in the above-described manner.

In the Figures the flexible rods (for example, rods 19 and 32) were, for the sake of clarity, drawn as relatively large-mass members. Such a property is not always necessary or desired for the intended function. Accordingly, FIGS. 10a and 10b illustrate a simplified version of the embodiment shown in FIGS. 9a, 9b and FIGS. 11a, 11b wherein, related to the edges, there is provided a fully symmetrical arrangement with zigzag-type interengagement.

In FIGS. 12a, 12bthere is illustrated still another, symmetrically drawn, modification of the zigzag-shaped embodiments without particular locking means, The parts, however, may be brought together in a simple manner, for example by means of additional edges arranged in a simple manner between the planar portions.

FIGS. 13a, 13b, 14a, 14b and 15a, 15b show arrangements for the automatic joining wherein, similarly to eariler-described embodiments, one member is a longitudinally slit-open tube which surrounds the other member. Contrary to the eariler-described embodiments, however, here the surrounded member is the more active one which can have two different energy states in which it has different thicknesses. It is apparent that arrangements of this type can be designed for an automatic separation. The two characteristics of the two types of embodiments, namely the provision of either an inner or an external active member, can also be combined. Further, arrangements are feasible that have a plurality of juxtapositioned or nesting component parts which operate differently or in the same manner.

Instead of or in combination with the elastic energy, pneumatic energy may be used which is supplied by gas or liquid pressure in hollow component parts. It is feasible to simultaneously utilize the pressure for remote control.

The embodiments having a constant cross section are particularly well adapted for use as watertight slide fasteners. The available forces are used for the pressing-together of the locking component parts.

In some embodiments particular effects may initiate the propagation of the transition from a higher energy state into a lower energy state without the intended connection taking place. Thus, an undesirable separation is effected between the boundary between the joined and the separated state and the boundary between the higher energy state and the lower energy state which then propagates by itself. In order to maintain this undesired phenomenon within limits, at least in embodiments with constant cross section, use can be made of the fact that edge portions of the cross sections slide on one another which they normally would not do or would do it in a different manner. For this purpose, there are provided along these edges, sufficiently closely to one another, deviations from the cross sections, such as indentations, projections or the like, to prevent the abovenoted propagation.

For a most convenient design for arrangements having a constant cross section, the use of materials having anisotropic elastic properties is advantageous. Such properties can also be simulated by using a corrugated material. Thus, for example, in the embodiment according to FIGS. 4a, 4b, by providing transverse valves in the band 20, the stiffness desired for the spreading-apart of the elastic tube can be combined with a flexibility which is necessary for the shifting of the band 20 in the zone of transition. In the embodiment according to FIGS. 5a and 5b, there is effected, in addition, the necessary expansibility of the band, required for the torsional deformation in the transition zone. Transverse waves (corrugations) in other components may serve for providing a flexibility on a large scale, depending on the type of use. A similar effect may be achieved with plates or shells which are provided with parallel cuts on each side. By means of a large number of cuts from the one or the other side one may further simulate non-continuous elastic properties if the slots are so dimensioned that their edges abut one another upon a suitable extent of bending.

It is further possible to segment the components by alternating removing and leaving in place, in the longitudinal direction, major parts of the cross section, so that the components are interconnected only along narrower zones, approximately along the sliding edges. These connected edges may be constituted as chains, at the links of which the segments are secured. These in some cases make possible stressless securing of carrier ribbons or bands.

Embodiments of locally varying thickness and attracting or repelling forces, the possibility of which, in the general case, with or without special interaction between the elements, need not be stressed, are obviously possible also in case of arrangements based on the constant cross section in case of a sufficiently small change of the cross section in the longitudinal direction.

It is further to be noted that particularly in arrangements with mutual interaction between elements of the same edge or surface, at the fastener ends a special terminal has to be provided, the design of which depends on the overall function of the arrangement. Thus, for example, in case of slide fastener-type arrangements, it is necessary to provide the possibility of initiating, after full adjoining, a separating step. A full separation should not be possible in some cases, or one should be able to initiate again the automatic joining after connecting the edges. For this purpose, the individual embodiments offer very obvious modifications. A new object is obtained, however, by the desideratum to prevent, in some cases, an automatic start of the closing (joining) operation. For this purpose one may provide enlargements, thickened or bulging portions of the profile in the vicinity of the closed end which can be traversed only by applying an additional force (it is feasible to provide several such means along the length of the fastener). As an alternative or in addition, the elastic components could be connected to one another at their ends in such a manner that they are movable about an axis perpendicular to the local plane of the fastener halves to make more difficult by lever action the starting of the joining process.

For some applications in embodiments with constant cross section, it may be expedient to dispense with the means for preventing the longitudinal shift (by means of fastening at the terminus); the components involved may be of different length.

It will be understood that the above description of the present invention is susceptible to various modifications, changes and adaptations, and the same are intended to be comprehended within the meaning and range of equivalents of the appended claims.

What is claimed is:

1. A fastener arrangement for joining or separating material edges or surfaces along a distance of indeterminate length, including two cooperating fastener halves secured to the one end and the other material component to be joined or separated; each fastener half being formed of a series of elemental length portions; each elemental length portion of the one fastener half cooperating with a separate elemental length portion of the other fastener half to form an element pair therewith; the improvement wherein each element pair has a first stable position in which the elemental length portions of the element pair are in a full, mechanical interengagement with one another; each element pair has a second stable position in which the elemental length portions of the element pair are mechanically fully disengaged from one another; each element pair has an unstable position in which the elemental length portions of the element pair are in a partial mechanical interengagement with one another; the fastener halves assuming a joined state where the element pairs are in said first stable position; the fastener halves assuming a separated state where the element pairs are in said second stable position; the improvement further comprising means incorporated in at least one elemental length portion of each element pair for exerting a force on the element pair where it is in its said unstable position, said force urging the element pair into one of its said stable positions; and slideless means for effecting, in the presence of at least one element pair in said unstable position, a self-propagation, from element pair to element pair, of a transition from the one stable position of the element pair through said unstable position into the other stable position; the elemental length portions of each series being disposed sufficiently close to one another to ensure said self-propagation by interaction between adjoining elemental length portions of the same series when the cooperating elemental length portions of element pairs of the one and the other series move from said unstable position into one of said stable positions.

2. A fastener arrangement as defined in claim 1, wherein at least one of the fastener halves includes a continuous, integral, one-piece part formed of said elemental length portions.

3. A fastener arrangement as defined in claim 1, wherein the elemental length portions of at least one of the fastener halves are discrete elements flexibly attached to one another.

4. A fastener arrangement as defined in claim 1, wherein at least one of the fastener halves includes a longitudinally slit-open tube for receiving elemental length portions of the other of said fastener halves in said joined state.

5. A fastener arrangement as defined in claim 4, wherein the elemental length portions of said other fastener half constitute a continuous, integral, one-piece rod received within said slit-open tube in the joined state.

6. A fastener arrangement as defined in claim 4, further comprising tensioning means for maintaining at least one of said fastener halves at a first energy level in the joined state and at a second energy level in the separated state.

7. A fastener arrangement as defined in claim 6, wherein said tensioning means maintains said slit-open tube tensioned in the separated state and releases said slit-open tube upon introduction of the elemental length portions of the other fastener half thereinto, whereby said first energy level is lower than said second energy level.

8. A fastener arrangement as defined in claim 7, wherein said tensioning means comprises a band-shaped body extending longitudinally within said tube and positioning means forming part of said tube for engaging opposite edge zones of said body for maintaining said tube in a tensioned, expanded condition at said second energy level, said positioning means releasing said opposite edge zones of said body upon introduction of the other fastener half into said tube for effecting a shift of said body parallel to itself to place said tube in a relaxed condition at said first energy level; said other fastener half being constituted by a continuous integral, one-piece rod.

9. A fastener arrangement as defined in claim 7, wherein said tensioning means comprises a band-shaped body extending longitudinally within said tube, and positioning means forming part of said tube for engaging opposite edge zones of said body for maintaining said tube in a tensioned, expanded condition at said second energy level, said positioning means releasing one of the edge zones of said body upon introduction of the other fastener half into said tube for effecting a pivotal movement of said body about the other of the edge zones to place said tube in a relaxed condition at said first energy level; said other fastener half being constituted by a continuous, onepiece rod.

10. A fastener arrangement as defined in claim 7, wherein said tensioning means comprises a band-shaped body extending longitudinally within said tube and having two opposed edge zones, said body being fixedly attached along one of its edge zones to said tube; and positioning means forming part of said tube for engaging the other edge zone of said body for maintaining said tube in a tensioned, expanded condition at said second energy level, said positioning means releasing said other edge zone of said body upon introduction of the other fastener half into said tube for bending said body away from said positioning means to place said tube in a relaxed condition at said first energy level; said other fastener half being constituted by a continuous, integral, one-piece rod.

11. A fastener arrangement as defined in claim 7, wherein said tensioning means comprises a first band-shaped body extending longitudinally within said tube and having first and second opposed edge zones; said first band-shaped body being fixedly attached to said tube along said first edge zone; a second band-shaped body extending longitudinally within said tube and having third and fourth opposed edge zones; said second bandshaped body being fixedly attached to said tube along said third edge zone at a location generally diametrically opposite from the location of attachment of said first edge zone of said first band-shaped body; and positioning means on said second and fourth edge zones for maintaining said band-shaped bodies in an edge-to-edge relationship for maintaining said tube in a tensioned, expanded condition at said second energy level; said positioning means releasing said second and fourth edge zones from one another upon introduction of the other fastener half into said tube for placing said tube in a relaxed condition at said first energy level; said other fastener half being constituted by a continuous, integral, one-piece rod.

12. A fastener arrangement as defined in claim 7, wherein said tensioning means includes positioning means provided along opposed edges of the slit-open tube for maintaining said tube in an edge-to-edge, tensioned condition at said second energy level; said positioning means releasing the tube edges from one another upon introduction of the other fastener half into said tube for placing said tube in a relaxed condition at said first energy level; said other fastener half being constituted by a continuous, integral, one-piece rod.

13. A fastener arrangement as defined in claim 4, wherein one of said fastener halves includes said slit-open tube; the improvement further comprising means for maintaining said other of said fastener halves at a relatively high energy level in the separated state and at a relatively low energy level in the joined state.

14. A fastener arrangement as defined in claim 4, wherein one of said fastener halves includes said slit-open tube; the other of said fastener halves includes a continuous, integral, one-piece rod received by said tube in said joined state; positioning means on said rod for maintaining said tube in an expanded condition in said joined state and allowing said tube to contract into a relaxed condition in said separated state, whereby said tube has a relatively low energy level in said separated state and a relatively high energy level in said joined state.

15. A fastener arrangement as defined in claim 1, further comprising means for maintaining the elemental length portions of at least one of said fastener halves at a first energy level in the joined state and at a second energy level in the separated state.

16. A fastener arrangement as defined in claim 15, wherein said first energy level is higher than said second energy level.

17. A fastener arrangement as defined in claim 15, wherein said first energy level is lower than said second energy level.

18. A fastener arrangement as defined in claim 1, wherein the force-exerting means includes interacting means provided on the elemental length portions of each element pair for generating said force when the elemental length portions assume said unstable position.

19. A fastener arrangement as defined in claim 18, wherein said elemental length portions are formed of first and second discrete elements and wherein each said first discrete element cooperates with a second said discrete element; cooperating first and second discrete elements being attached to the one and the other fastener half, respectively, each said first discrete element includes first and second pairs of resilient fingers; the resilient fingers forming each pair are facing one another; in each said first discrete element said two pairs are arranged at a substantially 90° orientation with respect to one another; in said separated state, the fingers of said first pair are spread apart and supported by edge faces of the fingers forming said second pair; each said second discrete element being formed of a substantially rigid head receivable in a socket constituted by the four fingers of the two finger pairs; said head including means for first further spreading apart the fingers of said first pair and then spreading apart the fingers of said second pair upon introduction of said head into said socket.

20. A fastener arrangement as defined in claim 19, said head further comprising means for maintaining, in the joined state, the fingers of said second pair in a tensioned, spreadapart position and means for relaxing, in the joined state, the fingers of said first pair.

21. A fastener arrangement as defined in claim 20, said head further comprising means for first spreading apart the fingers of said first pair and subsequently relaxing the fingers of said second pair upon moving said head from the joined state towards the separated state.

22. A fastener arrangement as defined in claim 1, wherein one of said fastener halves comprises a longitudinally extending flexible rod of predetermined thickness; the other of said fastener halves comprises a longitudinally extending, cross-sectionally relatively stiff outer tube having axially extending spaced edges defining a longitudinal slot having a width at least equalling said thickness; a longitudinally extending, cross-sectionally resilient inner tube disposed within said outer tube, said inner tube having axially extending edges defining a longitudinal slot oriented towards the slot of said external tube; and positioning means for maintaining said inner tube spread-apart and tensioned in said separated state and relaxing said inner tube in said joined state; said slot of said inner tube having, in said separated state, a width at least equalling said thickness; said slot of said inner tube having, in said joined state, a width smaller than said thickness; said rod being disposed in said inner tube in said joined state and being externally thereof in said separated state.

23. A fastener arrangement as defined in claim 22, wherein said positioning means includes inwardly oriented hooked ends of said edges of said outer tube for retaining said inner tube in the spread-apart condition effected by moving said rod substantially radially out of the slots from said joined state into said separated state.

24. A fastener arrangement as defined in claim 1, further comprising means including in each element pair for exerting a force on the elemental length portions forming the element pair when the distance between the elemental length portions of the pair is increased to a predetermined value, said force urging the elemental length portions of the element pair away from one another into said separated state.

* * * * *